J. P. O'NEILL.
KNOCKDOWN BOX OR CRATE FASTENING MEANS.
APPLICATION FILED FEB. 7, 1921.
1,405,150.
Patented Jan. 31, 1922.
2 SHEETS—SHEET 1.
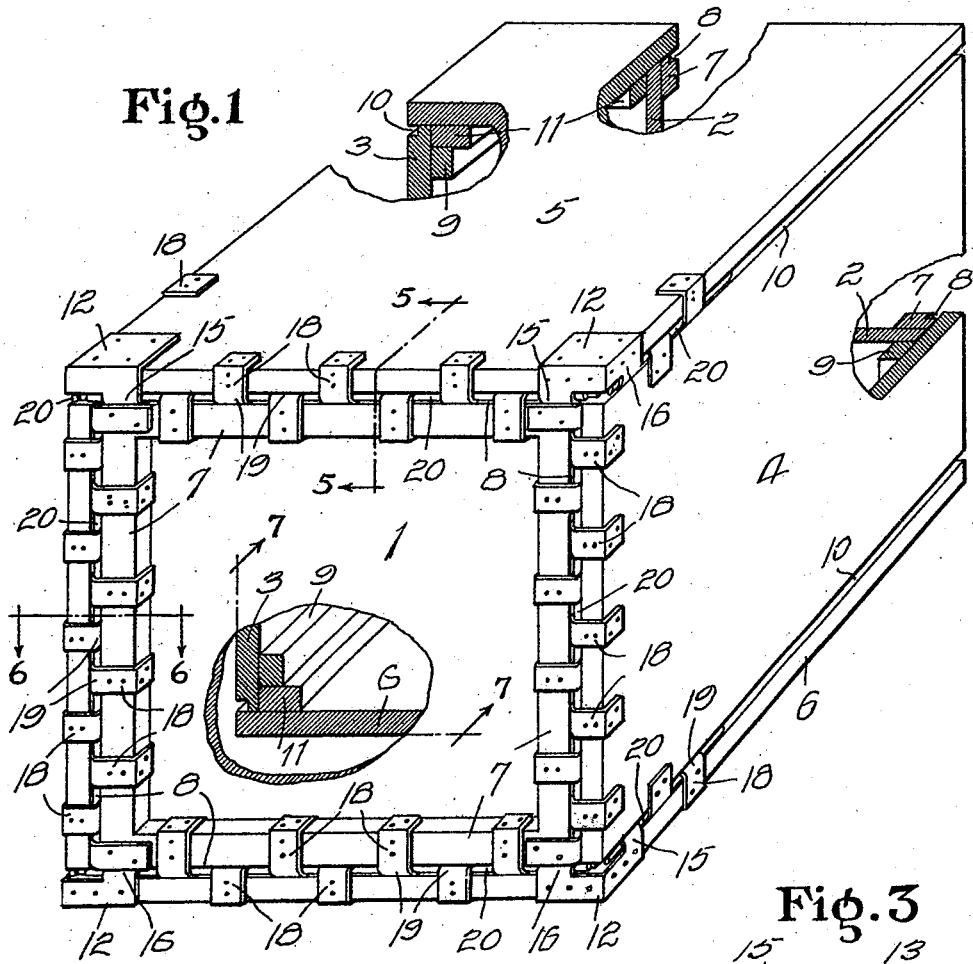
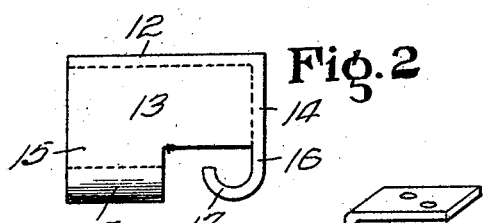
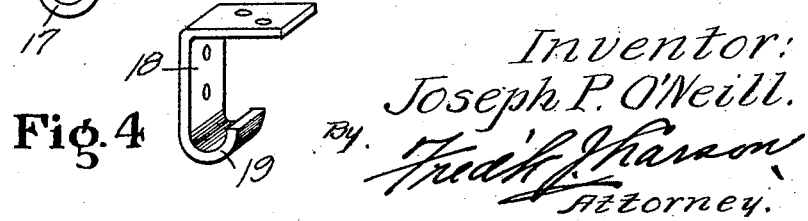
Inventor:
Joseph P. O'Neill.
By Fred'k J. Larson
Attorney.

J. P. O'NEILL.
KNOCKDOWN BOX OR CRATE FASTENING MEANS.
APPLICATION FILED FEB. 7, 1921.
1,405,150.
Patented Jan. 31, 1922.
2 SHEETS—SHEET 2.
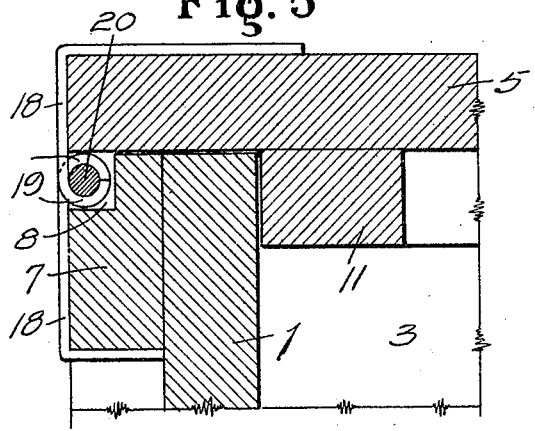
Fig. 5
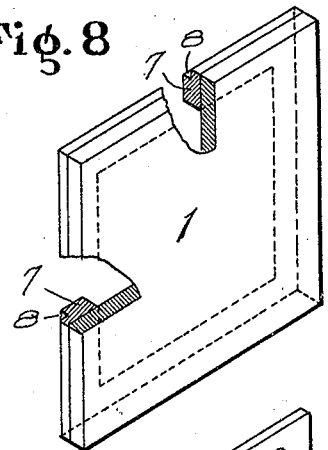
Fig. 8
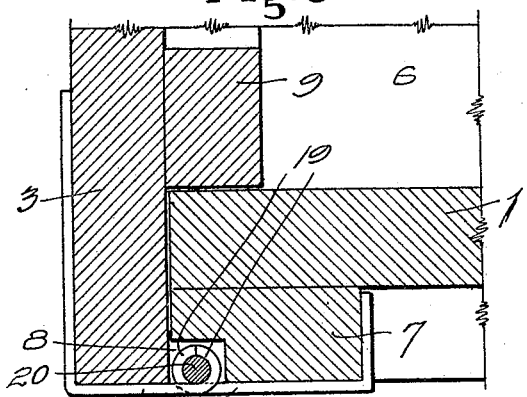
Fig. 6
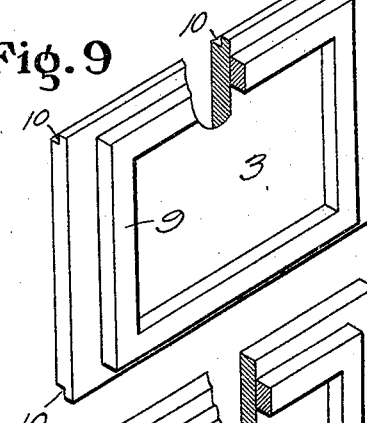
Fig. 9
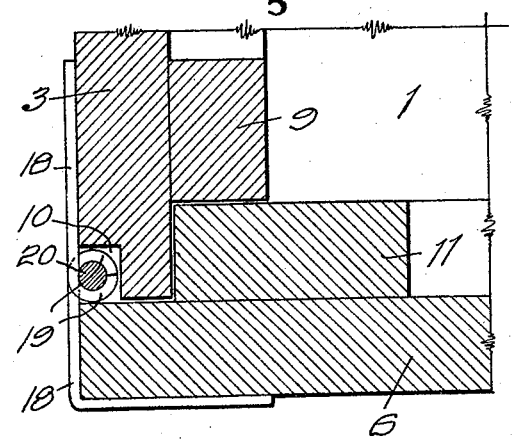
Fig. 7
Fig. 10
Inventor:
Joseph P. O'Neill.
By Fred'k J. Harson
Attorney.

UNITED STATES PATENT OFFICE.

JOSEPH P. O'NEILL, OF ST. LOUIS, MISSOURI.

KNOCKDOWN BOX OR CRATE FASTENING MEANS.

1,405,150. Specification of Letters Patent. Patented Jan. 31, 1922.

Application filed February 7, 1921. Serial No. 442,998.

*To all whom it may concern:*

Be it known that I, JOSEPH P. O'NEILL, a citizen of the United States, residing in the city of St. Louis and State of Missouri, have invented certain new and useful Improvements in Knockdown Box or Crate Fastening Means, of which the following is a specification.

My invention relates to improvements in knockdown box or crate locking means, and has for its object to provide simple fastening means conveniently arranged to rigidly connect the several members of a knockdown box, or crate structure for holding the several wall members, or parts of the structure in their set up relation.

A further object of the invention is the provision of simple corner fasteners provided with curved free ends adapted to lie in grooves in box members to form a passage adapted to receive a locking rod for connecting adjacent box members together.

With the above and other objects in view, the invention consists in the novel features of construction, arrangement and combination of parts hereinafter more fully described and finally pointed out in the claims hereto appended.

Referring to the accompanying drawings forming a part of this specification wherein like characters of reference denote similar parts throughout the several views:

Fig. 1, is a perspective view of a knockdown box, or crate provided with my improved locking means or fasteners.

Fig. 2, is a side elevation of one of the double corner fasteners.

Fig. 3, is a bottom plan view of one of the double corner fasteners.

Fig. 4, is a perspective view of one of the single corner fasteners.

Fig. 5, is a detail, in sectional elevation, taken on line 5—5 of Fig. 1.

Fig. 6, is a detail, in sectional elevation, taken on line 6—6 of Fig. 1.

Fig. 7, is a detail, in sectional elevation, taken on line 7—7 of Fig. 1.

Fig. 8, is a perspective view of one of the end walls.

Fig. 9, is a perspective view of the top and bottom walls.

Fig. 10, is a perspective view of the side walls.

In carrying out the aim of my present invention, I construct a knockdown box, or crate consisting of the end walls 1 and 2, the side walls 3 and 4, the bottom wall 5 and the top wall 6. The end walls are alike in structure, the side walls are alike in structure and the top and bottom walls are alike in structure. The box or crate can be made with, or without the top wall or cover 6.

Each end wall 1 and 2 is provided upon its outer face with a right angular cleat structure consisting of four cleat members 7. The front face of the cleat structure is provided with a suitable marginal angular groove 8.

Each side wall 3 and 4 is provided upon it inner face with a right angular cleat structure 9 which is positioned a suitable distance from the outer edges of each wall, as shown in Fig. 9. The outer face of each side wall is provided at its upper and lower edge with a longitudinal angular groove, or socket 10, as shown in Figs. 1 and 6.

The bottom and top walls 5 and 6 of the box, or crate, which are alike in structure, are each provided upon their inner face with a rectangular cleat structure 11 which is positioned in a suitable distance from the outer edges of each wall. The top and bottom walls are not provided with grooves, or sockets, as are the end and side walls.

Each corner of each top and bottom wall is provided with a double corner plate consisting of a body portion 12 which is bent at right angles on two joining sides 13 and 14 to provide an angular side wall which terminates in two J-shaped fastener arms 15 and 16, respectively, positioned at right angles to one another and spaced apart, as shown in Figs. 1, 2 and 3. The curved portions 17 of the J-shaped fastener arms 15 and 16 are receivable in the angular groove 8 of the end walls 1 and 2 and the grooves 10 of the side walls 3 and 4, respectively, as clearly shown in Fig. 1.

The end walls are duplicates, side walls are duplicates and the bottom and top walls are duplicates, thus are interchangeable. Each wall is provided with a plurality of suitable J-shaped single fasteners 18. The end fasteners 18 have their curved ends 19 receivable in the angular groove 8 of the end plates 1 and 2, while the curved ends of the single fasteners 18 extending from the side edges of the top and bottom walls are receivable in the grooves 10 of the side walls 3 and 4.

The side walls 3 and 4 are also each provided along their edges with a plurality of suitable spaced single J-shaped fasteners 18. The fasteners 18 fixed to the ends of the side walls have their curved ends receivable in the angular groove 8 of each end wall, while the curved ends of the fasteners 18 fixed to the upper and lower edges of the side walls are receivable in the upper and lower longitudinal grooves 10 of the side walls 3 and 4.

Each cleat structure of each end wall 1 and 2 is provided with a plurality of single J-shaped fasteners 18, the curved ends of which are receivable in the angular marginal groove 8 of the cleat structures 9.

Four locking rods 20 are employed at each end of the case, box or crate and are receivable in the marginal grooves of the end wall cleats and further engage the curved ends of the J-shaped fasteners of the end, top, bottom and side walls for locking the box members rigidly together, as is manifest.

The curved ends of the single J-shaped fasteners of one wall lie in a reverse direction to the single J-shaped fasteners of an abutting wall, thus forming a circular rod receiving opening by the alternate arrangement of the J-shaped fasteners.

Briefly, the knockdown box consists of the ends and several sides, each of which are provided around its edges with a plurality of J-shaped fastener members having their free curved ends receivable in a groove, so as to form by their alternate spaced arrangement, an opening along each edge of the box for the reception of a locking rod for firmly holding the several parts, or members of the box, or crate in a firm and positive position with relation to each other when the box, or crate is set up.

The many advantages of the hereindescribed invention will readily suggest themselves to those skilled in the art to which it appertains.

I do not desire to be understood as limiting myself to the exact details of construction and arrangement as herein described and illustrated, as it is manifest that variations and modifications may be made without departing from the spirit and scope of my invention and the terms of the following claims, hence I wish it to be understood that I reserve the right to make any such changes, or modifications as may fairly fall within the scope of the appended claims when fairly construed.

What I claim is:

1. A knockdown receptacle having end, top, bottom and side walls, said end walls having an angular groove and said side walls having a longitudinal groove along its upper and lower edge, J-shaped fasteners fixed to the top, bottom and side walls having their curved ends receivable in the longitudinal grooves of the side walls, locking rods engaging the curved ends of the J-shaped fasteners of the top, bottom and side walls for locking the said members of the box firmly together, J-shaped fasteners fixed to the end walls having their curved ends receivable in the angular groove of each end wall, J-shaped fasteners fixed to the ends of the top, bottom and side walls having their curved ends receivable in the angular groove of the end walls, and a plurality of locking rods engaging the curved ends of said last named fasteners for firmly locking the members of the box together at their ends.

2. A knockdown receptacle having end, top, bottom and side walls, said end walls having an angular groove and said side walls having a longitudinal groove along its upper and lower edge, J-shaped fasteners fixed to the top, bottom and side walls having their curved ends receivable in the longitudinal grooves of the side walls, locking rods engaging the curved ends of the J-shaped fasteners of the top, bottom and side walls for locking the said members of the box firmly together, J-shaped fasteners fixed to the end walls having their curved ends receivable in the angular groove of each end wall, J-shaped fasteners fixed to the ends of the top, bottom and side walls having their curved ends receivable in the angular groove of the end walls, a plurality of locking rods engaging the curved ends of said last named fasteners for firmly locking the members of the box together at their ends, and corner fasteners carried by the top and bottom walls having their curved ends receivable in the angular grooves of the end walls and the grooves of the side walls and the aforesaid locking rods also engaging said corner fasteners for strengthening the corners of the box.

3. A knockdown box comprising end walls having exterior cleats provided with an angular groove, side walls having an upper and lower longitudinal marginal groove, a top wall, a bottom wall, J-shaped fasteners fixed to the end walls and having their curved free ends receivable in the angular groove of the end walls, J-shaped fasteners fixed to the ends of the top, bottom and side walls and having their free curved ends receivable in the angular groove intermediate the curved ends of the end wall fasteners, rods engaging and uniting the fasteners for firmly locking the ends of the box with the top, bottom and side walls of the box, J-shaped fasteners fixed to the upper and lower edges of the side walls and having their curved free ends receivable in the upper and lower grooves of the side walls, J-shaped fasteners fixed to the side edges of the top and bottom walls having their free curved ends receivable in the grooves of the side walls intermediate the adjacent pairs of fasteners fixed to the side walls, and rods engaging and uniting said fasteners for rigidly locking and uniting the edges of the top and bottom walls with the upper and lower edges of the side walls.

4. A knockdown box comprising end walls having exterior cleats provided with an angular groove, side walls having an upper and lower longitudinal marginal groove, a top wall, a bottom wall, J-shaped fasteners fixed to the end walls and having their curved free ends receivable in the angular groove of the ends walls, J-shaped fasteners fixed to the ends of the top, bottom and side walls and having their free curved ends receivable in the angular groove intermediate the curved ends of the end wall fasteners, rods engaging and uniting the fasteners for firmly locking the ends of the box with the top, bottom and side walls of the box, J-shaped fasteners fixed to the upper and lower edges of the side walls and having their curved free ends receivable in the upper anl lower grooves of the side walls, J-shaped fasteners fixed to the side edges of the top and bottom walls having their free curved ends receivable in the grooves of the side walls intermediate the adjacent pairs of fasteners fixed to the side walls, rods engaging and uniting said fasteners for rigidly locking and uniting the edges of the top and bottom walls with the upper and lower edges of the side walls, corner fasteners fixed to the top and bottom walls of the box each having a curved arm receivable in the angular grooves of the end walls and a curved arm receivable in the longitudinal grooves of the side walls and in contact with the upper and lower end and side rods to add rigidity to the corners of the box.

5. In combination with two box members arranged at right angles to each other, one of which members is provided with a groove, fasteners fixed to the adjacent ends of said box walls having their free curved ends receivable in the groove of the one box member and a rod for locking the adjacent wall members together by engaging the curved ends of the fasteners and preventing the separating thereof due to the curved ends of the fasteners of one wall member being positioned in reversed relation to the curved end of the fasteners of the adjacent wall member.

In testimony whereof, I have hereunto signed my name to the specification.

JOSEPH P. O'NEILL.